(No Model.)
H. W. LESTER.
SADDLE.
No. 562,965. Patented June 30, 1896.
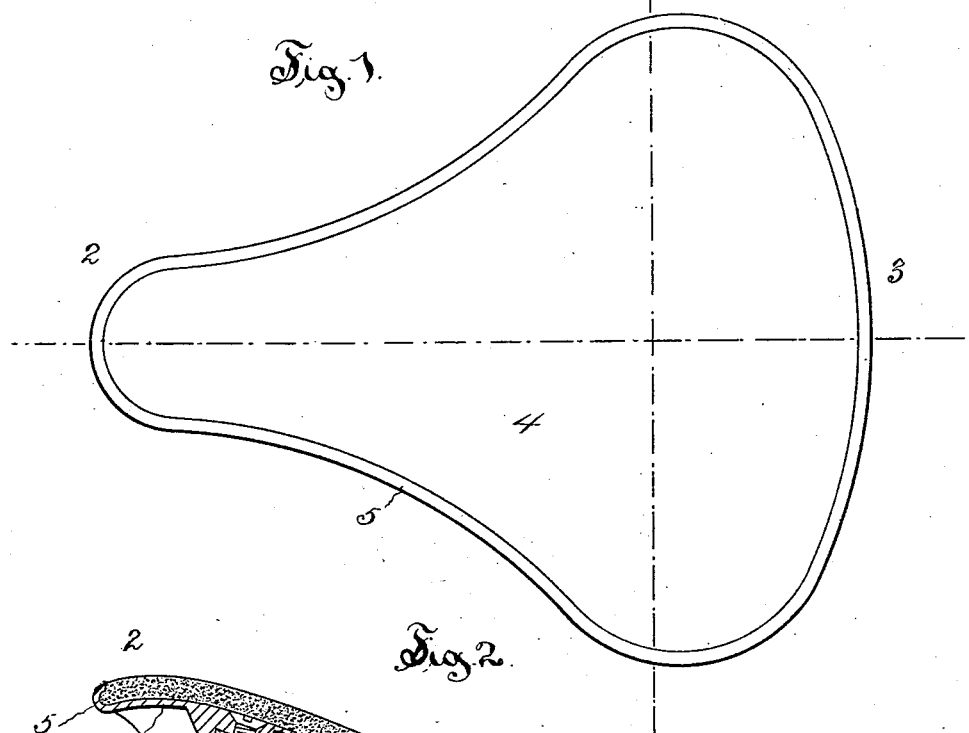
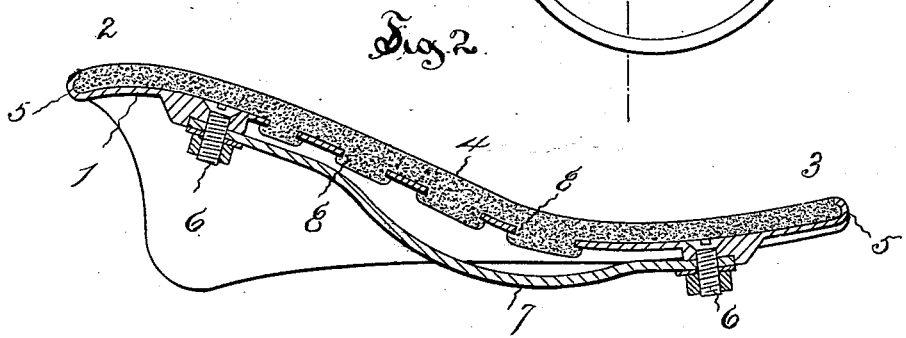
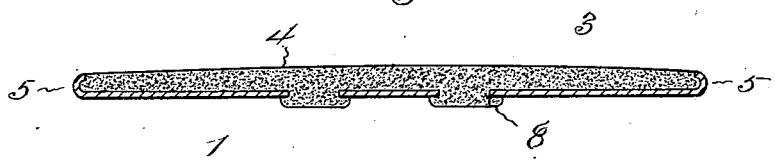
Witnesses:
Scott H. Smith
Andrew Ferguson
Inventor
Howard W. Lester,
Harry P. Williams
atty.

UNITED STATES PATENT OFFICE.

HOWARD W. LESTER, OF EAST HARTFORD, CONNECTICUT, ASSIGNOR TO FREDERICK C. ROCKWELL, OF HARTFORD, CONNECTICUT.

SADDLE.

SPECIFICATION forming part of Letters Patent No. 562,965, dated June 30, 1896.

Application filed August 26, 1895. Serial No. 560,513. (No model.)

*To all whom it may concern:*

Be it known that I, HOWARD W. LESTER, a citizen of the United States, residing at East Hartford, in the county of Hartford and State of Connecticut, have invented certain new and useful Improvements in Saddles, of which the following is a specification.

The invention relates to the construction of non-elastic seats or saddles for bicycles, tricycles, and the like vehicles.

The object of the invention is to provide a simple and cheap seat for such machines which is very light, strong, and durable, which is soft, cool, and comfortable, and which will retain its original shape, which can be made to closely conform to the outline of the body of the rider.

To this end the invention resides in a seat or saddle constructed with a light base of unchanging shape, which will insure strength and stiffness, with means for attaching the base to the frame of the bicycle or similar machine, and with a light and soft plastic material molded to place upon the upper surface of the base in such manner as to form a firm seat-cushion that will fit the body and retain its shape, as more particularly hereinafter described, and pointed out in the claims.

Referring to the accompanying drawings, Figure 1 is a plan of the saddle. Fig. 2 is a central longitudinal section of the same. Fig. 3 is a transverse section through the saddle.

The base 1 may be made from a thin piece of material, cast or molded to shape, or from sheet metal stamped to shape, with a common narrow pommel 2, and a wide curved cantle 3. The material for this base, preferably, is aluminium; but it may be brass, or any other suitable light thin material of sufficient strength that can be properly shaped.

In order to provide a shallow receptacle on the upper face for the cushioning material 4, the edges 5 are usually bent or formed up completely around when the base is made; but of course, if desired, these edges may be formed over after the cushioning material has been applied. Perforations may be made through the base for the passage of the screw-bolts 6, by means of which the saddle-spring 7 may be secured in place, and other perforations 8 may be made where it is thought necessary to allow the plastic material to flow through when it is applied and cling to the edges of the perforations, so as to more securely hold in place.

The cushioning material preferably consists of a composition having a body, as pulverized or broken cork, and a binding material, as shellac. The binding material is thoroughly intermixed with this body, and the whole molded under heat and pressure onto the upper face of the base of the seat in such manner that the material will flow under the upcurved edges of the base and through the perforations. After the material thus molded has become hardened the whole may be polished or smoothed off, as by sandpaper or other polishing means, so that the upper face of the saddle will conform to the body of the rider and will have smooth rounded edges without crack or ridge between the base and cushioning material.

If desired, a thin skin, of kid or similar material, may be tightly stretched over the saddle, thus giving it an additional finish.

A base of this character, which is light and easily formed, gives strength and firmness to the seat without too great rigidity. The cushion-cover for this base is light and soft, and it can be readily molded to place on the base in such a manner that it will not peel off or crack away. This cushioning material, made in this manner, can be easily given a very comfortable shape after having been molded in place on the base by sandpapering it to the desired outline, which also gives a very pleasing finish to the saddle. This upper cork-surface, of course, is soft, smooth, and cool for the rider. It does not abnormally wear, soil, or stain the clothing. It retains its shape, being unaffected by the weather, and the surface, while firm, smooth, and soft, is yet of such a nature that the rider when working violently does not tend to slip, and is not required to expend energy holding himself to the seat.

By means of this construction or combination of base and plastic cushioning material a seat is produced which is strong, durable, sightly, and very comfortable to ride. A firm seat is very desirable for extended rides, and this invention permits the use of this light cushioning material, that can be more comfortably ridden a long distance than an elastic or semielastic seat.

I claim as my invention—

1. A saddle consisting of a thin metal base formed with upturned edges to approximate the shape of the completed seat and with perforations through the base, said base being provided with means for attachment to a vehicle, and a plastic material molded to form upon the upper surface between the upturned edges of the base and passing through the perforations in the base, substantially as specified.

2. A saddle consisting of a thin metal base formed with upturned edges to approximate the shape of the completed seat, and provided with means for attaching the same to a vehicle, and a plastic material containing a quantity of broken cork molded to form upon the upper surface, between the upturned edges of the base, substantially as specified.

HOWARD W. LESTER.

Witnesses:
H. R. WILLIAMS,
SCOTT H. SMITH